United States Patent
Tran et al.

[19]

[11] Patent Number: 5,987,409
[45] Date of Patent: Nov. 16, 1999

[54] METHOD OF AND APPARATUS FOR DERIVING A PLURALITY OF SEQUENCES OF WORDS FROM A SPEECH SIGNAL

[75] Inventors: Bach-Hiep Tran; Frank Seide; Volker Steinbiss, all of Aachen, Germany

[73] Assignee: U.S. Philips Corporation, New York, N.Y.

[21] Appl. No.: 08/938,922

[22] Filed: Sep. 26, 1997

[30] Foreign Application Priority Data

Sep. 27, 1996 [DE] Germany .............................. 196 39 844

[51] Int. Cl.$^6$ ........................................................ G10L 7/08
[52] U.S. Cl. ............................................ 704/240; 704/253
[58] Field of Search ................................... 704/240, 256, 704/255, 251, 231, 253, 257

[56] References Cited

U.S. PATENT DOCUMENTS

| | | | |
|---|---|---|---|
| 4,980,918 | 12/1990 | Bahl et al. ............................... | 704/256 |
| 5,623,609 | 4/1997 | Kaye et al. .............................. | 704/231 |
| 5,634,083 | 5/1997 | Oerder .................................... | 704/253 |

OTHER PUBLICATIONS

"A Word Graph Based N–Best Search in Continuous Speech Recognition", Bach–Heip Tran, Frank Seide, Volker Steinbiss, Proceedings ICSLP 96, 4th Int'l Conference on Spoken Language Processing (Cat. No. 96TH8206), Philidelphia, Pa, BD 4, Oct. 3–6, 1996, pp. 2127–2130, IEEE New York, NY 1996.

Primary Examiner—Richemond Dorvil
Attorney, Agent, or Firm—Daniel E. Tierney

[57] ABSTRACT

The determination of a plurality of sequences of words from a speech signal with a decreasing probability of correspondence utilizes the best word sequence as a basis and as further word sequences there are determined only those which enclose a part of the best word sequence, that is to say the remainder of these word sequences. To this end, the recognition involves first the formation of a word graph and the best word sequence is separately stored as a tree which initially has one branch only. The word boundaries of this word sequence form nodes in this tree. Because only nodes of this tree have to be taken into account for the next-best word sequences, the calculation is substantially simpler than if the complete word graph were first completely expanded in the form of a tree and completely searched again for each new word sequence.

5 Claims, 3 Drawing Sheets

METHOD OF AND APPARATUS FOR DERIVING A PLURALITY OF SEQUENCES OF WORDS FROM A SPEECH SIGNAL

BACKGROUND OF THE INVENTION

The invention relates to a method of deriving at least one sequence of words from a speech signal which represents an expression spoken in natural speech, the individual words of the expression not necessarily being spoken with speech intervals inserted therebetween. Merely a vocabulary is given, so that only words of this vocabulary can be derived. The derived sequence of words should correspond exactly to the spoken sequence of words. Therefore, such methods are also called speech recognition methods. The invention also relates to an arrangement for deriving at least one sequence of words.

In a method of this kind which is known from published European patent application EP 614 172 A2, to which U.S. Pat. No. 5,634,083 corresponds, individual words are derived by comparison with reference signals where each reference signal corresponds to a spoken word in the vocabulary, the derived words being combined so as to form a word graph. Because complete correspondence to the reference signals hardly ever occurs in practice, a plurality of similarly sounding words is derived, simultaneously or with a time overlap, each of said words being assigned a respective score in conformity with the degree of correspondence to the respective reference signals. The sequence of consecutive words for which the smallest sum of scores occurs is output as the most probably spoken word sequence.

However, it often occurs that, because of a non-optimum pronunciation, the sequence having the smallest sum of scores is not exactly the actually spoken word sequence, since the word graph of the latter has a higher sum of scores. In order to enable such an actually spoken word sequence to be output nevertheless, it is known in principle to derive a plurality of word sequences from a speech signal for which the probability of correspondence with the speech signal is step-wise lower for successive sequences. For example, an operator can then select the actually spoken word sequence from this plurality of word sequences. A further application for the output of different word sequences with a decreasing probability of correspondence to the speech signals concerns dialogue systems in which the word sequence output is used for an automatic database enquiry. Therein, the word sequences recognized as being most probable could lead to meaningless or non-interpretable database enquiries whereas a word sequence of lower probability leads to a useful database enquiry; therefore, it may be assumed that such a word sequence best corresponds to the actually spoken sentence.

The generation of a plurality of word sequences of different probability of correspondence to the speech signal, however, is generally very complex from a calculation point of view. The Proceedings ICASSP-91, pp. 701 to 704, Toronto 1991, describe a method for finding multiple sentence hypotheses in which the steps enabling backtracking of the various sentence hypotheses are complex.

SUMMARY OF THE INVENTION

It is an object of the invention to provide a method and an apparatus arrangement which are based on word graphs and enable, using simple means, the generation of a plurality of different word sequences with a decreasing probability of correspondence to the spoken expression, leading to increasingly larger sums of scores.

This object is achieved according to the invention mainly in that the word sequence exhibiting the best acoustic correspondence to the speech signal is used as a basis. The invention is based on the idea that the word sequences of decreasing acoustic correspondence to the speech signal must contain parts of these acoustically more similar word sequences. Therefore, this word sequence, also referred to hereinafter as the first word sequence, is used as a basis. This first word sequence is separately stored in the form of a tree which initially has only one branch and contains a number of nodes which represent the boundaries between the individual words. Each node in this tree corresponds to a node in the word graph which contains a plurality of further nodes. In order to find a further word sequence having the next-larger sum of scores, for each node in the tree the corresponding node in the word graph is searched and also the optimum path segment through the word graph until the start, i.e. the path segment having the smallest sum of scores. This sum is incremented by the scores of the words in the remainder of the tree as far as the end node, and the path segment having the smallest sum of scores thus increased, together with the remaining word sequence in the tree, provides the word sequence with the next-larger sum of scores. The tree is then extended by this sub-sequence of words, since for each further word sequence to be determined the branches already present in the tree, or more exactly speaking the last word of the sub-sequence, must be excluded. Because the tree comprises only a comparatively small number of nodes in comparison with the word graph, further word sequences can thus be determined while using simple arithmetic means.

Preferably, the calculation of the sum of scores of a word sequence along a path through the word graph also takes into account language model values which indicate the probability of sequences of $n \geq 1$ given words. For $n=1$ these are Unigram language model values; that is, the probability of occurrence of individual words as such. Better results, however, are already obtained for $n=2$; that is, with language model values of a Bigram language model. This reduces the possibility that meaningless word sequences are output, even if they exhibit a comparatively strong acoustic correspondence to the speech signal.

The calculation work can be reduced further as follows. If, after the determination of the first and every further word sequence, the optimum path segment in the word graph until the start of the graph is searched for each tree node then present and if the associated sum of scores is formed and incremented by the scores of the remaining word sequence in the tree, this incremented sum of scores is stored at the relevant tree node. If a further word sequence is then determined which consists of a path segment and the remainder of the word sequence in the tree, the individual edges of this new path segment are marked in the word graph in order to ensure that this path segment is no longer taken into account for the determination of a further word sequence. The values stored for all other tree nodes remain the same and need not be calculated again for the determination of the next word sequence. Instead of marking the node of the path segment, it is also possible to determine for the relevant tree node the best path segment from all remaining path segments in the word graph and to store the corresponding score at the tree node, so that the next word sequence follows directly from the smallest one of the sums of scores stored at all tree nodes.

The probability that a plurality of word sequences thus determined indeed includes the actually spoken word sequence can be further increased by additionally evaluating these word sequences, after determination, with a more complex language model. This results in new scores for the individual word sequences, so that the order of the word sequences possibly changes; for example, the second-best word sequence could become the fourth-best word sequence after the additional evaluation, whereas the third-best word sequence before the additional evaluation could become, for example the second-best word sequence. The word sequences can then be output and possibly further processed in this modified order.

BRIEF DESCRIPTION OF THE DRAWINGS

An embodiment of the invention will be described in detail hereinafter with reference to the drawing. Therein.

DESCRIPTION OF THE PREFERRED EMBODIMENTS

Figure 1:
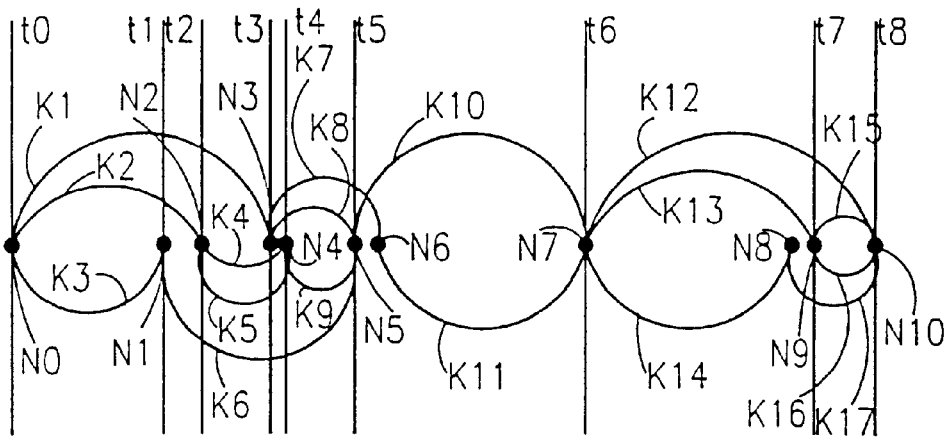
FIG. 1 shows a part of an example of a word graph.

The word graph shown in FIG. 1 comprises a number of nodes N0 to N10 which are shown in a row for the sake of clarity. The nodes N0 to N10 represent boundaries between words which are denoted by the edges (lines) K1 to K17; the word boundaries occur at different instants t0 to t8. This graph is formed by comparing the speech signal with reference signals, different sequences of reference signals being associated with different words. When a sequence of reference signals exhibits adequate similarity to a segment of the speech signal, the corresponding word is added to the word graph. In practice such a word graph also comprises a number of further nodes with successive other words which, however, have been omitted for the sake of clarity; only the nodes are shown which correspond to nodes of the tree shown in FIG. 3.

The node N0 represents the beginning of the speech signal, for example a system's request to a user to start speaking. At the node N0 first there is a silence, because the user does not start speaking immediately.

Because noise is often superposed on a speech signal, at the instant t1 the silence represented by the edge K3 is assumed to be terminated in the node N1 and the beginning of a word, commencing with the edge K6, is recognized. According to a further hypothesis, the silence represented by the edge K2 is considered to be terminated at the instant t2 in the node N2 and the start of two possible words, denoted by the edges K4 and K5, is recognized. Depending on the similarity of the individual words to the speech signal in the relevant segment, these individual words are assigned scores which, however, are not given in FIG. 1. Finally, according to a third hypothesis the silence represented by the edge K1 is considered to be terminated only at the instant t3 in the node N3, and the start of two feasible words, denoted by the nodes K7 and K8, is recognized. The entire word graph shown in FIG. 1 is formed in this manner.

When the end of the speech signal is reached at the node N10, where a possibly subsequent silence is not shown, all possible paths through the word graph, even paths through nodes and edges not shown in FIG. 1 but actually present, are followed and the scores associated with the words along these paths are summed. Preferably, language model values are then also taken into account, notably language model values of a Bigram language model. This reduces the probability that word sequences which practically do not occur in a normal sentence are output as a possible word sequence if they have a suitable acoustic similarity to the speech signal or the corresponding segment of the speech signal. Finally, all feasible paths terminate in the node N10 and the path having the best sum of scores is output as the first word sequence.

Figure 2:
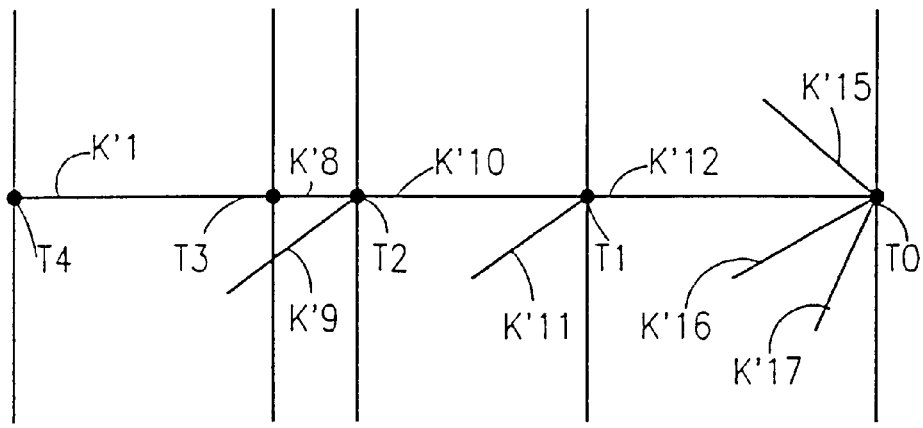
FIG. 2 shows a tree after determination of the best word sequence.

At the same time this first word sequence is separately stored as a tree as indicated in FIG. 2, said tree initially consisting of a single branch only. This tree contains the words K'1, K'8, K'10 and K'12 which correspond to the edges K1, K8, K10 and K12 in the word graph of FIG. 1. At the word boundaries between the words there are situated the nodes T0 to T4 which are in this case numbered as from the end node T0 and correspond to the nodes N10, N7, N5 and N3 in the word graph of FIG. 1. FIG. 2 also shows how possible candidates for the second-best word sequence can be found, said candidates thus having a sum of scores which is larger than that of the best word sequence but smaller than that of all other possible word sequences in the word graph. The second-best word sequence can contain only a sub-sequence which must in any case terminate in one of the nodes of the tree. In this example, for the node T2 it can only be a sub-sequence which terminates with the word K'9 corresponding to the edge K9 in the word graph. For the node T1 only one word sequence is feasible, which sequence ends with the word K'11, since only the two edges K10 and K11 converge to the node N7 in the word graph. The edge K10, however, has already been used by the best word sequence. It is merely for the end node which also constitutes a possible node for the second-best word sequence that three different word sequences are possible, terminating with the words K'15, K'16 and K'17. Which of all possible word sequences is actually the second-best word sequence is determined by forming, for each of the possible sub-sequences, the sum of the scores of the words situated therein and by incrementing this sum by the scores of the remaining words in the tree already present. In as far as a plurality of possible sub-sequences can terminate at a node in the tree as the second-best word sequence, only the sub-sequence from among such a plurality of feasible sub-sequences which has the smallest sum of the scores can be a possible candidate for the second-best word sequence. At each tree node, i.e. in this example at the tree nodes T2, T1 and T0, the relevant incremented sum of scores is stored. During a further step, the stored values are compared and the smallest value indicates the node at which the second-best word sequence terminates in the best word sequence.

Figure 3:
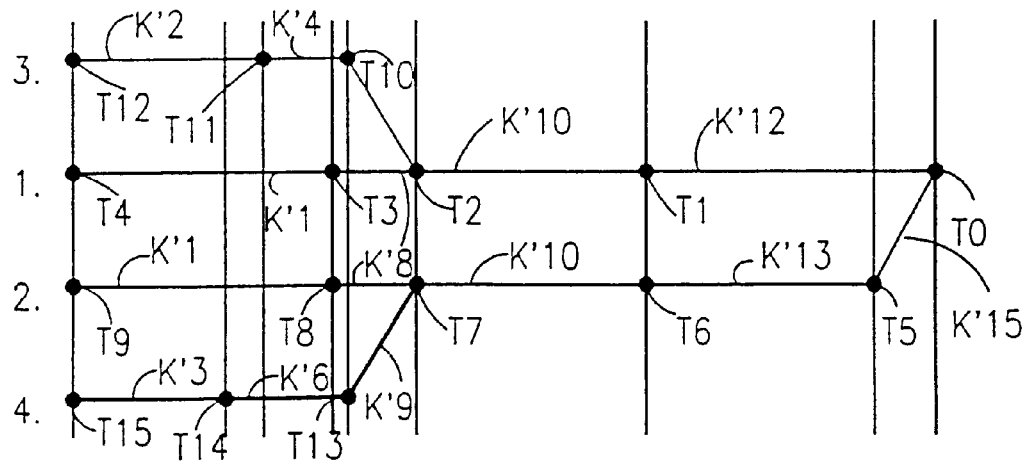
FIG. 3 shows the extension of the tree after the determination of four word sequences.

FIG. 3 shows merely an example for the four best word sequences. The order is indicated by the numbers at the left-hand end of the individual branches. As already indicated in FIG. 2, the best word sequence contains the words K'1, K'8, K'10 and K'12. The second-best word sequence terminates into the best word sequence only at the end node T0 and contains the words K'1, K'8, K'10, K'13 and K'15. This word sequence additionally contains the nodes T5 to T9. The third-best word sequence terminates into the best word sequence at the node T2 and contains the words K'2, K'4, K'9, K'10 and K'12. This yields the additional nodes T10 to T12. The fourth-best word sequence in this example terminates in the node T7 of the second-best word sequence and contains the words K'3, K'6, K'9, K'10, K'13 and K'15.

It is to be noted that, formally speaking, the silence associated with the edges K1, K2 and K3 is also deemed to be a word, because in the implementation of this method the silence is also formally treated as a word in order to achieve as simple as possible processing.

It is also to be noted that, for example, the word K'10, corresponding to the edge K10 in the word graph, occurs in the best as well as in the second-best word sequence. Because these two word sequences meet only in the end node T0, from the next-best word sequences only those sequences are excluded which contain the word K'12 as the last word, i.e. all sub-sequences containing the edge K12 are blocked in the word graph.

Figure 4:
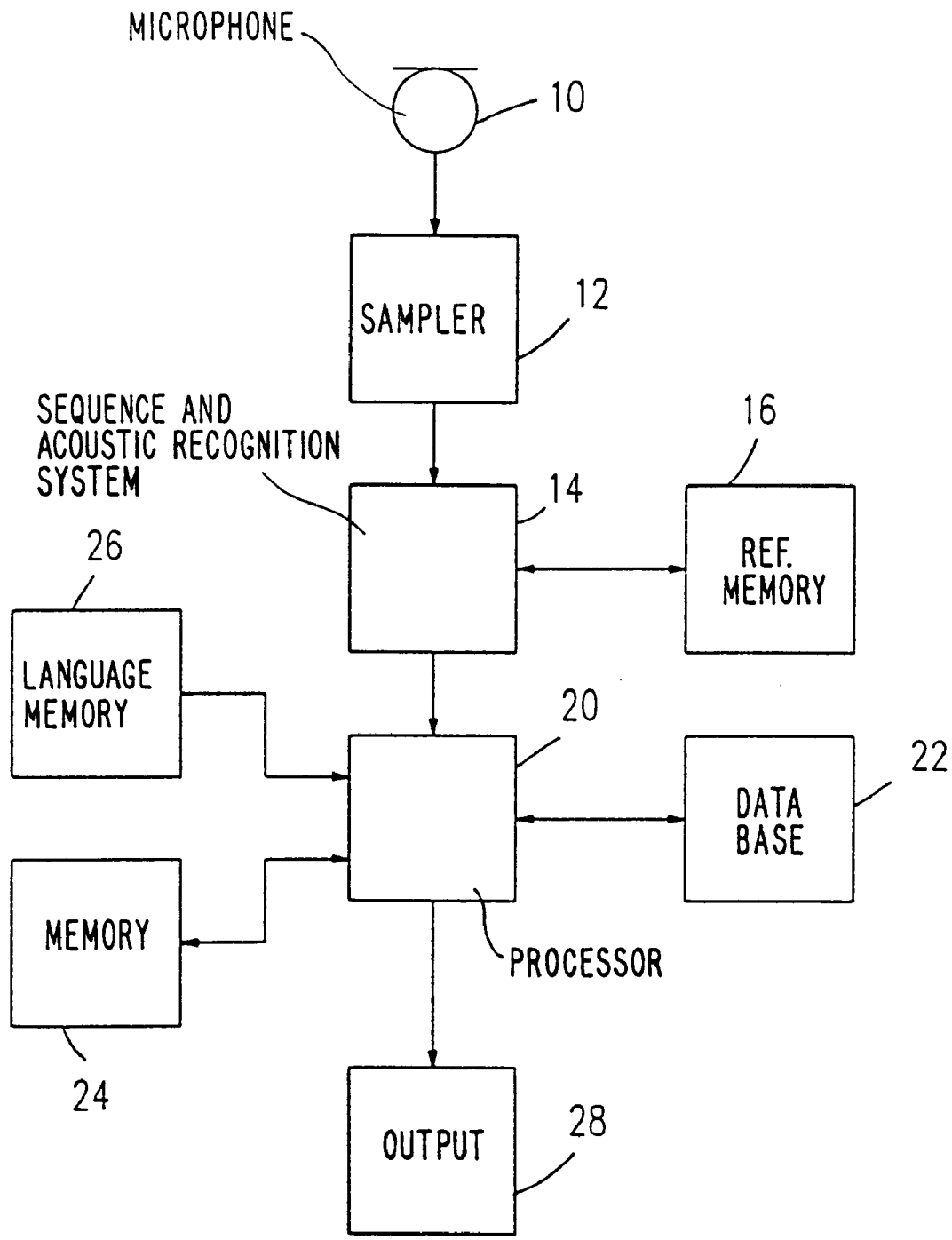
FIG. 4 shows a block diagram of an arrangement according to the invention.
Figure 5:
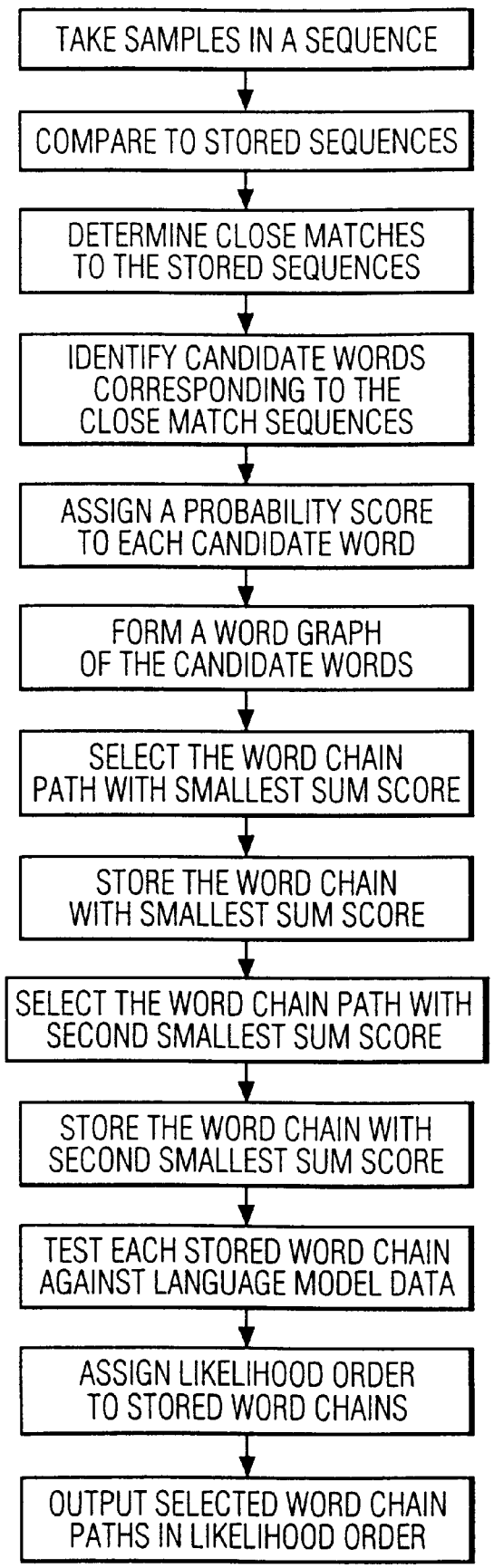
FIG. 5 is a flow chart of the method according to the invention.

FIG. 4 shows diagrammatically an example of an arrangement for carrying out the described method. Therein, a speech signal picked up by a microphone 10 is repeatedly sampled in a sampler circuit 12 and test signals characterizing the sampled speech signal are derived from the samples. These test signals are applied to a sequence and acoustic recognition system 14 in which the test signals are compared with a number of reference signals from a memory 16. These reference signals form a number of sequences, each of which is associated with a word of the vocabulary. The recognition sequence and acoustic system 14 thus performs an acoustic recognition on the speech signal during which a plurality of hypotheses are formed and words formed with an adequate probability of correspondence to the speech signal are output. A measure of such probability is contained in scores output in association with the words.

The words which are output form a word graph with nodes and edges, the edges corresponding to the words and the nodes being associated with instants at which at least one word ends and at least one further word begins. Various paths are feasible through this word graph. These paths are searched to identify the paths for which the sum score of the words thereon is as small as possible, starting with the path having the smallest sum score of all feasible paths.

For the word chain determined on this path the acoustic probability that it corresponds to the speech signal is highest, but it may occur that, for example due to unclear pronunciation, another word chain having a slightly higher score actually represents what the person delivering the speech signal wanted to say. The probability of an error can be reduced, but not fully precluded, by using a language model while determining the word sequences in the graph. Such errors are very annoying, for example in the case of information systems where a user issues a spoken enquiry to the system wherefrom an access to a data base must be derived. The word sequence with the best score possibly contains inconsistencies or contradictions or leads to a data base access which cannot be executed because the corresponding data is not present in the data base. Therefore, from a word graph formed there are preferably derived a plurality of word sequences with increasingly less attractive scores until a word sequence is found which satisfies the given requirements.

This operation is performed in a processor 20 which receives the word graph. This processor first determines the path through the graph on which the words have the most favourable sum score. This word chain is stored in a memory 24. For the determination of a next word chain, having the next less attractive score, only those sub-sequences of words through the word graph, starting from the beginning of the word graph, are taken into account which have at least one sub-node in common with the path on which the word sequence with the best overall score was found. To this end, preferably a start is made from the node on this path and the sub-sequences extending thereto are tracked backwards. Consequently, the extraction of each further word sequence requires substantially less calculation work than if the entire word graph had to be searched for each further word sequence.

The sub-sequence of each further word sequence which is not yet presented in the memory 24 is stored therein. Thus, a tree structure of word sequences having at least the end point of the word graph in common is formed in the memory 24. When a sub-sequence is to be tracked backwards from a node present in the memory 24, sub-sequences already present in the memory 24 are excluded of course. To this end it suffices to exclude, starting from each node, every word already present in the memory 24 in the direction of this node.

For the determination of a word sequence having the next less attractive score, like for the determination of the sequence having the best score, generally speaking a language model is taken into account which is stored in a memory 26 which is coupled to the processor 20.

For example, information for a data base enquiry made to a data base 22 is generated from the word sequences thus determined. The various word sequences can the be determined first and used successively for a data base enquiry, or first only the optimum word sequence is determined and it is tested whether a contradiction-free and feasible information item can be formed thereby for a data base enquiry; it is only if this is not the case that the next word sequence with a less favourable score is formed.

Finally, the processor 20 can apply the answer resulting from the data base enquiry to an output device 28. However, if the system concerned is not an information system but, for example a dictation system for converting a speech signal into written text, the word sequences determined by the processor 20 are applied directly to the output device 28. If this device is, for example a display screen, a user then checks whether the test reproduced on the display screen corresponds to the speech signal and, if this is not the case, a signal is applied to the processor 20, for example via a keyboard, so as to determine or output the next word sequence.

We claim:

1. A method of deriving at least one sequence of words of a predetermined vocabulary from a speech signal, including the following steps:

a) providing a store of words and reference signals, different words being associated with different sequences of said reference signals, b) deriving test signals from the speech signal, c) comparing the test signals with said different sequences of said reference signals, d) determining words with scores based on the comparisons of test signals and forming a word graph therefrom which contains nodes as word boundaries and words as edges, e) identifying a first path through the word graph with the smallest sum of scores of the sequence of words, characterized in that the method further comrpises the steps of:

f) storing, in order to output further sequences of words having a next-larger sum of scores, the sequence of words on the first path as a basis for a tree having tree nodes at the word boundaries and one end node, g) forming, for each tree node and for the path segment of the word graph which extends to the corresponding graph node, the overall sum of scores which are situated thereon as from the start of the word graph, the path segments with the sequences of words determined thus far being excluded therefrom, h) identifying the sequence of words for which the sum of the scores of the words on a path segment in the word graph as far as the graph node corresponding to a tree node, and from this tree node in the tree, is smallest, the already stored tree being extended by the sequence of words on this path segment, and i) repeating steps g) and h) at least once, and j) outputting a plurality of mutually different sequences of words having progressively higher scores.

2. A method as claimed in claim 1, characterized in that the method further comprises:

storing, for each respective tree node, the sum of the scores of the words on the best path segment in the word graph prior to the graph node corresponding to said respective tree node, and from said respective tree node to the end node in the tree, outputting the sequence of words associated with the minimum sum of the scores of all nodes as the further sequence, marking the tree nodes and associated sums of scores, associated with the path segment with the outputted words, determining and storing the sum of the scores for the marked tree nodes only, and determining a next further sequence based on the sum of the scores for the marked tree nodes.

3. A method as claimed in claim 1, characterized in that for each path values indicating the probability of sequences of $n \geq 1$ given words are taken into account.

4. A method as claimed in claim 3, characterized in that the method further comprises:

storing, for each respective tree node, the sum of the scores of the words on the best path segment in the word graph prior to the graph node corresponding to said respective tree node, and from said respective tree node to the end node in the tree, outputting the sequence of words associated with the minimum sum of the scores of all nodes as the further sequence, marking the tree nodes and associated sums of scores, associated with the path segment with the outputted words, determining and storing the sum of the scores for the marked tree nodes only, and determining a next further sequence based on the sum of the scores for the marked tree nodes.

5. An apparatus for deriving a plurality of sequences of words of a predetermined vocabulary from a speech signal, comprising:

a sequence and acoustic recognition system for deriving a word graph based on the speech signal, means for assigning probability scores for each word in the word graph, means for storing and outputting at least one word sequence, based on said word graph, having a minimum sum of scores, a memory for storing the output word sequence in the form of a tree, a processor, including means for receiving the word graph, for deriving from the word graph, after the first word sequence output, only those word sequences having at least one word boundary in common with the already stored word sequences, and excluding sub-sequences of words which start from the beginning of the word graph and at least the last word of which corresponds to a sub-sequence stored in the memory, and storing in said memory from each newly output word sequence only the parts which differ from the word sequences already stored, and means for additionally outputting said word sequences having at least one word boundary in common with the already stored word sequences and excluding said sub-sequences of words.

* * * * *